Figure 1:
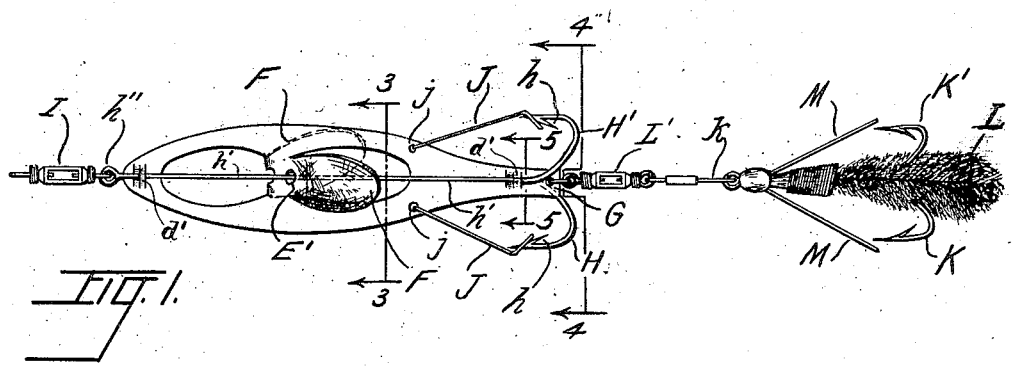

H. M. TILESTON, DEC'D.
J. F. DEVINE, ADMINISTRATOR.
FISHING TACKLE.
APPLICATION FILED OCT. 4, 1909.

1,036,380.

Patented Aug. 20, 1912.

WITNESSES:
O. O. Svem
C. A. Adams.

INVENTOR
Henry M. Tileston,
By
Charles Turner Brown,
ATTORNEY ated Aug. 20, 1912.

UNITED STATES PATENT OFFICE.

HENRY M. TILESTON, OF CHICAGO, ILLINOIS; JOHN F. DEVINE ADMINISTRATOR OF SAID TILESTON, DECEASED.

FISHING-TACKLE.

1,036,380.

Specification of Letters Patent.

Patented Aug. 20, 1912.

Application filed October 4, 1909. Serial No. 520,966.

*To all whom it may concern:*

Be it known that I, HENRY M. TILESTON, a citizen of the United States, and a resident of Chicago, in the county of Cook and State of Illinois, have invented certain new and useful Improvements in Fishing-Tackle, of which the following, when taken in connection with the drawing accompanying and forming a part hereof, is a full and complete description sufficient to enable those skilled in the art to which it pertains to understand, make, and use the same.

This device relates to fishing tackle designed to be attached to a line, and to be used by moving the same through the water by means of said line. And the object of this invention is to obtain a device which may be attached to a line and used in the manner described, for catching fish, with or without bait, as preferred.

A further object of this invention is to obtain a device of the kind described, which will attract fish thereto, which may be used in clear water, and in places where weeds and other plant growths are in the water, and a device which is economical in construction, durable and not liable to get out of order.

Figure 2:
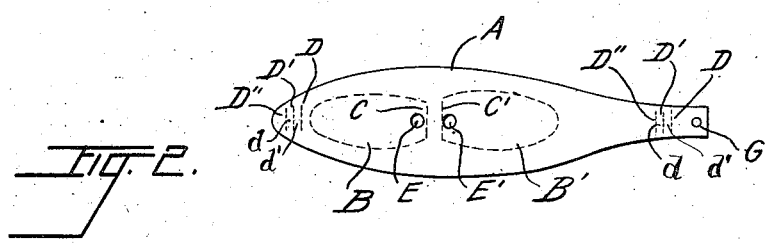
Figure 3:
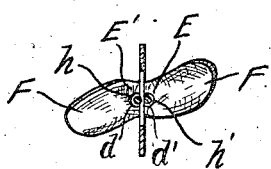
Figure 4:
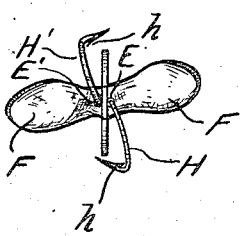
Figure 5:
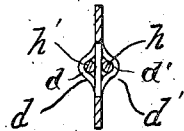

In the drawing referred to Figure 1 is a side elevation of a device embodying this invention. Fig. 2 is a plan view of a blank from which the main, or body part of the device is obtained. Fig. 3 is a vertical sectional view, on line 3—3 of Fig. 1, viewed in the direction indicated by the arrows. Fig. 4 is a vertical sectional view on line 4—4 of Fig. 1, viewed in the direction indicated by the arrows. And Fig. 5 is a vertical sectional view on line 5—5 of Fig. 1, viewed in the direction indicated by the arrows.

A reference letter applied to designate a given part is used to indicate such part throughout the several figures of the drawing, wherever the same appears.

A (Fig. 2), is the blank from which the body of the device is obtained, and B, B', are broken lines on which cuts are made in said blank. C, C', are broken lines on which the portion of the body included within lines B, and B', are bent outward from the remainder of the body, to obtain wings, of such shape as to produce revolution of the body of the device when the same is drawn through water, as hereinafter set forth. D, D', and D'', are broken lines on which cuts are made in said blank A. By making the cuts D, D', and D'', I obtain parts $d$, $d'$, which are respectively forced out from the remainder of the blank, one on each side thereof.

E, E' are apertures in blank A. Apertures E, E', are in the portion of said blank which is included within lines B and B', so that when said portions are forced out to form the wings F, F, said apertures will come in said wings. G is an additional aperture in blank A.

H, H', are hooks, respectively provided with barbs $h$, $h$, and with shanks $h'$, $h'$. Hooks H, H', are respectively secured to the body part of the device, to turn therewith as the same rotates, by passing the shank $h'$ thereof alongside of said body part, underneath the parts $d$, $d'$, and through the aperture E, and when preferred using solder or other suitable substance to rigidly secure said shanks to said body part. The forward ends of shanks $h'$ are looped to obtain an eye, ($h''$), and I is an ordinary swivel, one end whereof is attached to eye $h''$, and the other end to a line, in the ordinary way of attaching hooks and spoons to lines.

J, J, are wires rigidly secured to the body part of the device, at $j$, and arranged to contact with the barbs $h$, $h$, at the other end to protect said barbs when the device is being drawn through water having vegetable growths therein.

I' is a swivel one end whereof is secured to the body part of the device, as by passing it through aperture G, and K, K', are hooks attached by the shank $k$ thereof to one end of swivel I' and L is a lure.

M, M, are guards to the barbs of the hooks K, K'.

When a line is attached to the device, and said device is drawn through the water, rotation or spinning of the body part of the device, hooks H, H', and the guards J, J, is produced by the wings F, F, and said part of the device has at said time the appearance of a minnow or other small fish. Even without the swivel I' and the non-rotating hooks K, K', said parts of the device present an appearance calculated to attract the attention of certain fish and to be seized by them; and when hooks K, K', and lure L are attached to the revolving part of the device an additional attraction is presented. The blank A, when provided with the wings or paddles F, F, forced out from between lines B, B', as described, constitutes a spinning device; that is, when said device is drawn through the water by a line attached to the other end of either one of the swivels I, I', said blank (or body part of the device), rotates or spins in the water. The hooks H, H', which are rigidly attached to said blank and the guards J, J, (when present) spin therewith and thereby a solid body is simulated and at the same time, the aperture in blank A and the open space between the barbs h, h, of hooks H, H', and said blank, continuously give successive changes tending to attract the attention and arouse the curiosity of certain fish.

Blank A is preferably made of bright metal as aluminum, tin, nickel (or nickel plated metal) and parts thereof, say the ends and one side of the wings, are preferably colored or painted. Luminous paint may be used on the device.

When the device is thrown into the water and sinks by its weight, the wings F, F, cause the body part of the device, together with the hooks thereon, to rotate, as well as said wings cause rotation when the device is in a running stream or is drawn through still water by a line.

Having thus described my invention what I claim as new and desire to secure by Letters Patent is:—

In a device of the kind described, a body part made of sheet metal the contour lines whereof substantially correspond with the contour lines of a longitudinal section of a fish, in combination with hooks attached thereto, said body part provided with integral wings which are formed by forcing right and left duplicate parts, forming a substantial part of said body part out from the central portion thereof to leave a bar integral with said body part midway of the length of said body part, the ends of said duplicate parts remaining integral with said bar and one thereof bent forward and the other backward on said bar into position to rotate said body part when said device is drawn through the water, and means to rotatably attach said body part to a non-rotating line, whereby, when said device is drawn through the water the appearance of a solid body of substantially the shape of a fish is obtained.

HENRY M. TILESTON.

In the presence of—
CHARLES TURNER BROWN,
CORA A. ADAMS.